July 5, 1960
R. K. SHEWMON ET AL
2,944,126
CONTROL FOR FLUID SUSPENSION SYSTEM
Filed Aug. 4, 1958
3 Sheets-Sheet 1
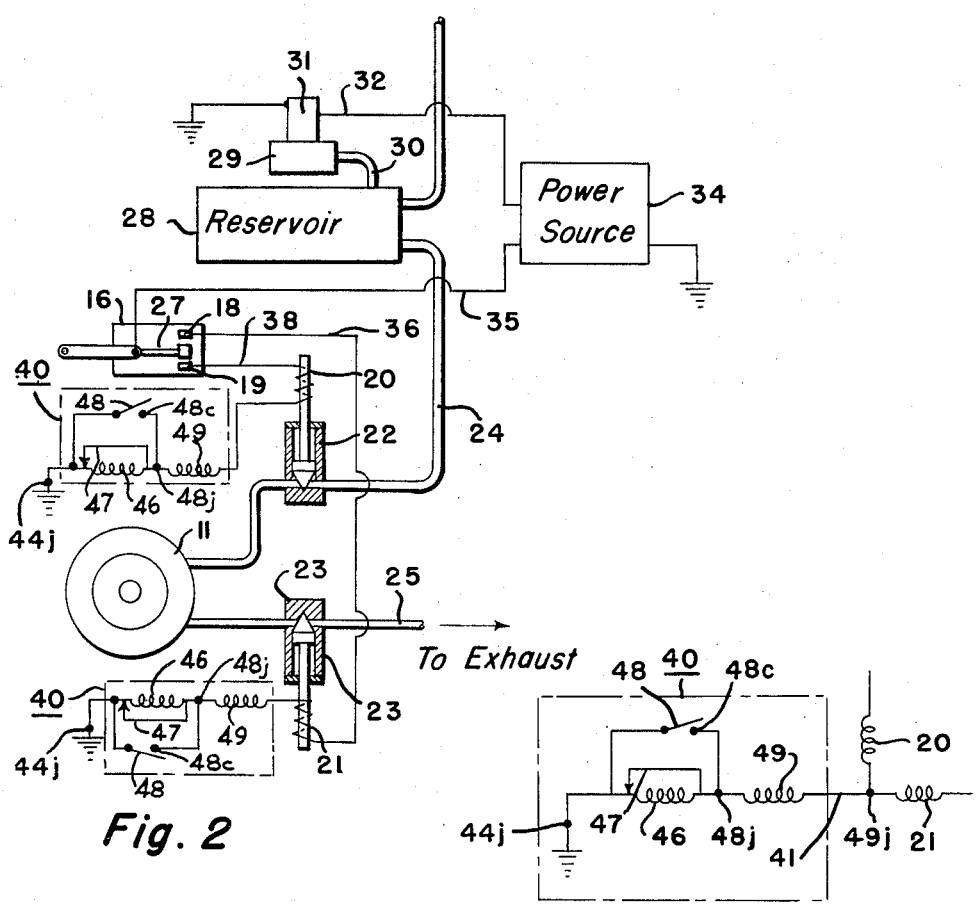
Fig. 2
Fig. 2a
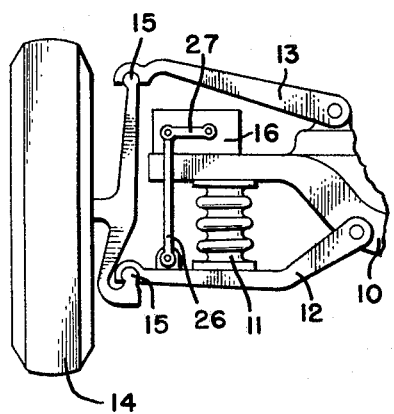
Fig. 1
INVENTORS
Ralph K. Shewmon
BY George Neyhouse
John T. Marvin
Their Attorney July 5, 1960 R. K. SHEWMON ET AL 2,944,126
CONTROL FOR FLUID SUSPENSION SYSTEM
Filed Aug. 4, 1958 3 Sheets-Sheet 2
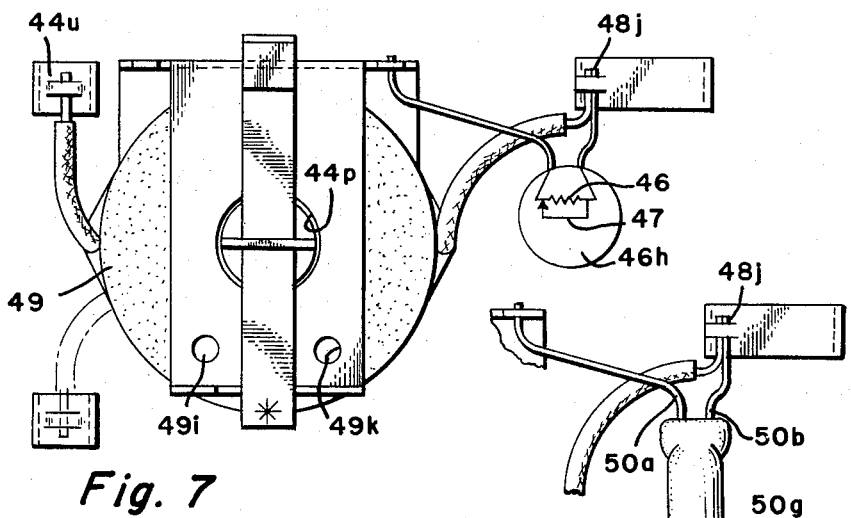
Fig. 7
Fig. 7a
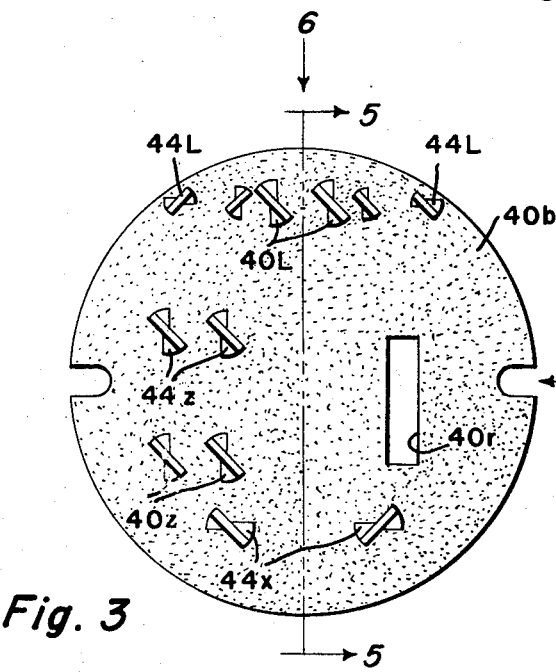
Fig. 3
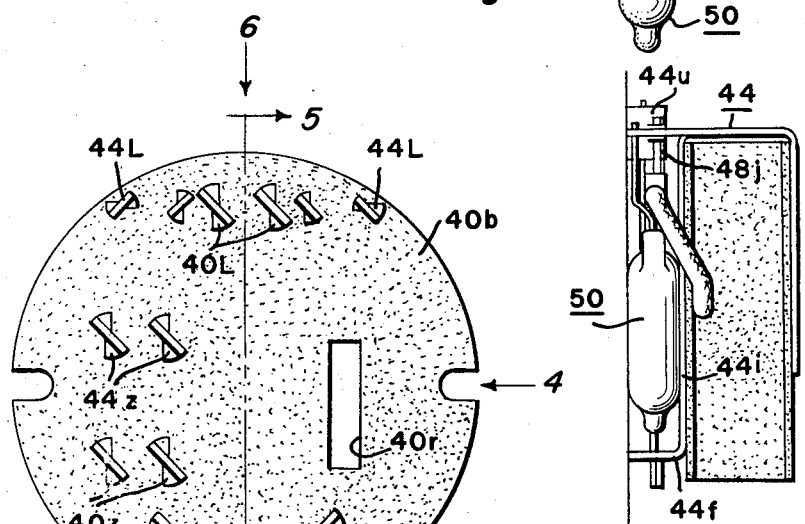
Fig. 7b
INVENTORS
Ralph K. Shewmon
BY George Neyhouse
John T. Marvin
Their Attorney

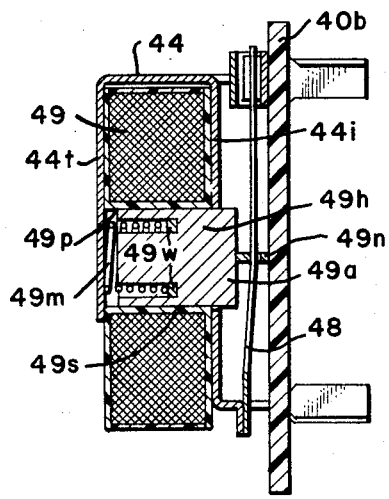
Fig. 5
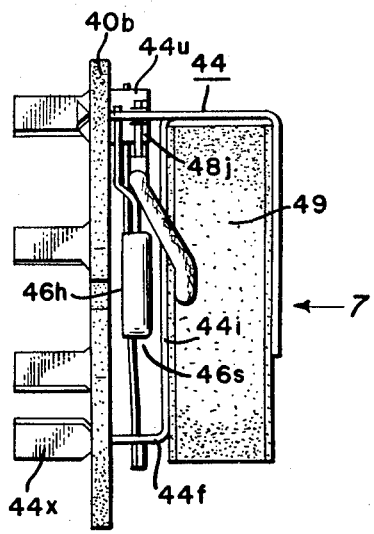
Fig. 4
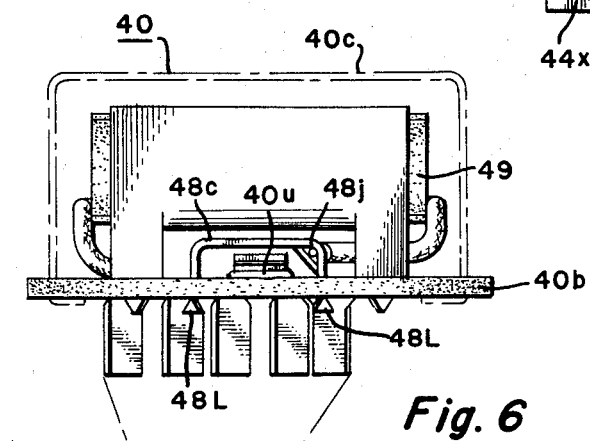
Fig. 6
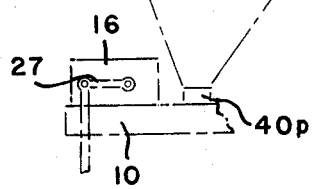
INVENTORS
Ralph K. Shewmon
BY George Neyhouse
Their Attorney United States Patent Office
2,944,126
Patented July 5, 1960

2,944,126

CONTROL FOR FLUID SUSPENSION SYSTEM

Ralph K. Shewmon, Centerville, and George A. Neyhouse, Dayton, Ohio, assignors to General Motors Corporation, Detroit, Mich., a corporation of Delaware Filed Aug. 4, 1958, Ser. No. 752,711

2 Claims. (Cl. 200—88)

This invention relates to a control mechanism for a fluid suspension system of a motor vehicle and, particularly, to a system wherein a fluid expansible bellows spring supports a chassis or sprung mass upon a running gear or unsprung mass and wherein electrically operated valves are provided in air pressure inlet and exhaust lines for the fluid expansible bellows spring.

An object of this invention is to provide a new and improved electrical control mechanism for use in air suspension systems having air springs for maintaining a predetermined clearance height between sprung and unsprung masses of a vehicle.

Another object of this invention is to provide an electrical control mechanism operative to effect inlet and exhaust of air relative to an air spring between sprung and unsprung masses of a vehicle with electrically operated valve mechanism having solenoid or coil means in series with at least one electrical delay means adapted to provide a lapse of time prior to electrical valve operation for effecting inlet and exhaust of air relative to the air spring in response to changes in clearance height between sprung and unsprung masses as static and dynamic forces exerted on the spring change due to differing static loads or due to differing instantaneous dynamic conditions occurring with varying shocks and forces when the vehicle is operating on the road.

Another object of this invention is to provide electrically operated valves in combination with electrical delay means for use in an air suspension system including air springs supporting a sprung mass or chassis on an unsprung mass or undercarriage of a vehicle.

Another object of this invention is to provide a compact and unitary electrical delay means including a housing providing a terminal base and a bracket and support for an annular coil and armature engageable with relay contact means after a delay of time established by a resistance wire flasher device in series with the coil and adapted to be shorted to prevent cycling after inital operation thereof.

A further object of this invention is to provide a compact and unitary electrical delay means for use in series with an electrically operated valve means adapted to control inlet and exhaust of air relative to an air suspension system air spring provided to maintain a predetermined clearance height between a sprung mass and an unsprung mass of a vehicle also provided with a linkage and electrical switching means sensitive to increase and decrease of height between the sprung and unsprung masses but effective to correct clearance height through operation of the valve means only after a predetermined electrical delay provided by the delay means.

Another object of this invention is to provide an air suspension system for a motor vehicle wherein expandable air springs are provided for supporting a sprung mass or an unsprung mass and wherein a delay means is provided as a control in an electric circuit in combination with an electrically driven compressor for supply of air to the system, the delay means including a relay time delay coil in series with a solenoid of a valve governing air inlet and exhaust relative to the spring and also including a bimetallic leaf contact adapted to close a circuit to eliminate voltage drop across the time delay coil after a predetermined heating time and thereby permitting an operating voltage to be impressed upon the valve solenoid to effect correction in height in accordance with positioning of a height control switch operable for up and down actuation of the circuit.

Further objects and advantages of the present invention will be apparent from the following description, reference being had to the accompanying drawings wherein preferred embodiments of the invention are clearly shown.

In the drawings:

Figure 1 is a diagrammatic view of a fluid suspension system for a motor vehicle.

Figure 2 is a schematic diagram of an electrical control mechanism for a fluid suspension system incorporating features of this invention.

Figure 2a illustrates a modification of a fragment of the diagram of Figure 2.

Figure 3 is a bottom view of a time delay relay assembly in accordance with the present invention.

Figure 4 is a side elevational view of the time delay relay assembly taken in the direction of arrow 4 in Figure 3.

Figure 5 is a cross-sectional elevational view taken along line 5—5 of Figure 3.

Figure 6 is a side elevational view of the time delay relay assembly taken in the direction of arrow 6 in Figure 3 and including a phantom representation of an annular cover portion of a housing for the assembly and a phantom of a vehicle frame or sprung mass supporting a plug or socket means adapted for mounting the time delay relay assembly for the air suspension system.

Figure 7 is a partially developed fragmentary plan view of the relay assembly taken in the direction of arrow 7 in Figure 4.

Figures 7a and 7b shown fragmentary views of modifications in structure shown in Figures 7 and 4 respectively.

In Figure 1 there is shown a portion of a vehicle including a sprung mass, chassis, or frame 10 that is supported by an expansible fluid spring carried between the frame 10 and a lower control arm or unsprung mass 12 of a front end of a suspension of a vehicle that also includes an upper control arm 13. The control arms 12 and 13 are journalled relative to a wheel assembly 14 through spherical joints 15. The fluid spring 11 preferably comprises an expansible bellows containing fluid under pressure sufficient to support the sprung mass or chassis 10 upon the unsprung mass or wheel assembly and undercarriage. The fluid or air spring 11 is provided to establish a predetermined height relationship between the sprung mass 10 and the wheel assembly or unsprung mass. This predetermined height relationship can be referred to as a clearance height relative to the unsprung mass and sprung mass and also relative to a roadway on which the wheel assembly is movable.

The expansible bellows 11 is adapted to receive fluid, preferably air, under pressure for support of the sprung mass relative to the unsprung mass. Controls are necessarily provided to admit air under pressure into the bellows or to exhaust air from the bellows in response to a change in static load on the sprung mass and also in response to changes in clearance height when road conditions become rough and result in an average change in clearance height to other than the predetermined clearance height. When an average change occurs in the clearance height to other than the predetermined clearance height during a vehicle movement, dynamic forces on the unsprung mass are such that a correction in clearance height is desirable. Changes in static load on the sprung mass can cause the chassis to move downwardly relative to the running gear or unsprung mass when the load increases and similarly can cause the chassis to rise relative to the unsprung mass when load decreases. Thus air under pressure must be added into a chamber within the bellows spring when the load increases so as to compensate for increased load and thereby to maintain a predetermined clearance height relationship between the chassis and the running gear of the vehicle. Conversely, when the load on the chassis is decreased, it is necessary to exhaust air from the bellows spring to provide for correction of clearance height to allow the chassis to settle downwardly relative to the running gear thereby re-establishing predetermined height relationship between the chassis and running gear of the vehicle.

In some fluid suspension systems mechanically operated valving is provided for the air pressure inlet and exhaust lines and this valving is actuated through levers by a change in clearance height relationship between the chassis and running gear of the vehicle. In other systems, electrically operated valves are provided in the air pressure inlet and exhaust lines and these electrically operated valves are actuated upon the closing of electric switches that respond to changes in clearance height relation between the sprung mass and the unsprung mass of a vehicle. The switches are adapted to open electrically operated inlet valves in response to a decrease in clearance height relationship and are adapted to open the exhaust valve in response to an increase in clearance height relationship.

In fluid suspension systems, there is provided a source of fluid under pressure preferably including a reservoir containing air under pressure. This source and reservoir assure provision of a continuous supply of fluid or air available for use in supplying air under pressure for the fluid springs of the vehicle. An air compressor is provided for maintaining a body of fluid in the reservoir at a relatively constant pressure level and the compressor can be adapted to be driven by a fan belt of a vehicle motor or engine or can be adapted to be driven by an electric motor that receives its current for operation from a battery provided on the motor vehicle.

As illustrated in Figs. 1 and 2, supply of air to the air spring 11 or exhaust of air from the spring is controlled by a wheel switch 16 preferably mounted on the chassis or sprung mass 10 of the vehicle. The wheel switch 16 has contacts 18 and 19 connected with electric solenoids 20 and 21 respectively of a pair of solenoid operated valves 22 and 23. Valve 22 is placed in a pressure inlet line 24 provided to supply fluid under pressure to the air spring 11. The valve 23 is placed in an exhaust line 25 through which air can be relieved from the air spring 11.

The electric switch 16 includes a switch arm 27 connected by means of a link 26 to the lower control arm 12. This linkage connection between the lower control arm and the electric switch 16 is adapted to result in closing of contacts of the switch 16 in response to a change in height relationship between the sprung mass and unsprung mass of the vehicle. A change in height relationship to other than the predetermined clearance height can occur both due to a change in static loads or due to a change in dynamic loading forces between the sprung and unsprung masses of the vehicle as mentioned earlier. Air under pressure that is conducted through the inlet line 24 is received from a body of air under pressure maintained in a reservoir 28. An air compressor 29 is connected to supply air under pressure through a conduit 30. The air compressor 29 is adapted to be driven or operated by an electric motor 31 that receives power through a line 32 from a source generally indicated by numeral 34. It is to be understood that the electrically driven compressor can be replaced with an engine driven compressor without departing from the scope of the present invention. For purposes of illustration the electrically driven compressor is shown schematically with the air suspension system in accordance with the present invention.

The source of electric power 34 is connected through a line 35 with the switch arm 27 of wheel switch 16 as shown in Fig. 2. A circuit is closed for actuation of electrically operated valves 22 and 23 in response to movement of the link 26 so that switch arm 27 touches contacts 18 or 19 respectively. When the switch arm 27 touches contact 18 power is supplied from the source 34 through the line 35 and switch 16 to a line 36 having a solenoid 21 in series with a delay means generally indicated by numeral 40. Similarly, when the link 26 actuates the switch arm 27 to close a circuit with contact 19, a circuit is completed from the source 34 through line 35 and switch 16 through a line 38 including a solenoid 20 in series with another delay means also generally indicated by numeral 40 because substantially identical structure in accordance with the present invention can be used as electrical delay means provided in the circuit with both of the solenoid operated valves 22 and 23.

In Fig. 2a, there is a showing of a fragment of the diagram of Fig. 2 representing a modification in circuit arrangement wherein the delay means generally indicated by numeral 40 is not provided in series with each of the solenoids 20 and 21 directly, but rather in which there is a common connection 41 whereby either solenoid 20 or solenoid 21 can be connected in series with the same unitary and compact delay means 40 upon actuation of the switch 16. In some instances it is possible to eliminate use of a separate delay means 40 for each solenoid coil but preferably a delay means 40 is provided in series with each solenoid or coil 20 and 21 as shown in Fig. 2. The circuit from the source 34 in either event is completed through the switching means 16 and one or the other of the solenoids 20 and 21 in series with the delay means 40 to a ground connection as illustrated schematically.

The delay means 40 comprises a unitary and compact structure which will be described in further detail below and which includes as shown schematically a resistance 46 adapted to effect heating of a bi-metallic contact element 47. The resistance element 46 in addition to heating the bi-metallic or first contact member 47 also serves as a time delay coil to effect closing of a second contact element 48 of the time delay means. A holding coil 49 in series with the resistance is operatively associated with the secondary contact element 48 so that the contact is held closed once a time delay has been effected through heating of the resistance member 46 effecting closing of the bi-metallic contact member 47. The voltage drop across the relay coil 49 in series with the resistance element 46 is insufficient to effect closing of the secondary contact 48 so long as the bi-metallic contact member 47 has not been sufficiently heated to effect a shorting out of the resistance member 46. As soon as the resistance member 46 is shorted out, there is a sufficient voltage drop across the relay coil 49 to effect shorting and closure of the holding contact 48.

Electric power from source 34 does not pass through the valve operating solenoids 20 or 21 and time delay means 40 until the switching means 16 is actuated to close a connection with contacts 18 or 19 by way of switch arm 27. The operation of the delay means 40 is identical for the circuits illustrated in Figs. 2 and 2a except that an opportunity for cooling of heating elements 46 is greater with the circuit arrangement of Fig. 2 because no residual heat is encountered in a delay means used both for up and down leveling height correction as with the circuit of Fig. 2a. Preferably the resistance 46 and bi-metallic contact 47 are in the form of a flasher provided in a compact and unitary delay means assembly in accordance with the present invention. The secondary contact 48 is provided to short out the flasher once an initial delay period has been effected and the secondary contact 48 prevents repetition or cycling of the operation of the flasher including the heating resistance 46 and bi-metallic contact 47. Preferably the flasher is adapted to operate under conditions in which a 12 volt source of electric power can be used with the motor vehicle. However, it is to be understood that voltage ratings for the solenoid coil 49 and flasher can be such that any other voltage rating in a source of electric power can be provided with a motor vehicle.

If the source of electric power 34 of a motor vehicle is adapted to operate at a higher voltage, the flasher including the heating resistance 46 and bi-metallic contact element 47 can be replaced with a gaseous electric tube shown in a fragmentary view of Fig. 7a, and another fragmentary developed view of Fig. 7b. This tube is identified generally by a reference numeral 50 in Figs. 7a and 7b and includes a glass envelope 50g in which there is provided an inert gaseous medium such as Argon, Krypton, etc. A contact element 50a and a bi-metallic element 50b are provided within the glass envelope 50g, and arcing or ionization of the gaseous matter within the glass envelope effects heating of the bi-metallic element sufficient to short a contact whereby voltage across a coil such as the coil 49 as illustrated with the delay means 40 in Figs. 2 and 2a is sufficient to close a normally-open shorting contact such as 48. The delay occurs in the ionization of the gas due to passage of electric current therein effecting an impedance drop across the gaseous electric tubular means 50 similar to an impedance drop across the resistance heating element 46 illustrated in Figs. 2 and 2a. However, the gaseous medium provided in the glass envelope 50g must be such that the voltage and current from the source of electric power such as 34 provided with the vehicle can effect ionization of the inert gas. Some inert gases require voltages of 50 volts for ionization but suitable heating can be effected by selection of proper voltage and gas. Higher voltage sources can be provided on motor vehicles equipped with suitable A.C. generators and rectificating systems. Generally a gaseous tube is less sensitive to vibration and to ambient temperature condition, and in some instances is used preferably in place of the resistance element 46 in a flasher device in combination with the delay means 40 of the present invention. However, the use of an inert gas in electric tubular means can be more expensive due to the rarity of the gas, and therefore the flasher device including the resistance element 46 and bi-metallic contact 47 is preferably used as a portion of the delay means assembly 40 in accordance with the present invention.

The delay means 40, in accordance with the present invention, is adapted to be provided as a compact and unitary assembly having structure illustrated in Figs. 3, 4, 5, 6, 7, 7a, and 7b. The delay means indicated generally by numeral 40 in these views of the drawings includes a base 50b and a cover 40c shown in phantom in Fig. 6. The base 40b is made of a suitable insulating material so as to provide slots through which a plurality of terminals protrude. The terminals are adapted to engage a socket or plug means 40p provided in a suitable location on an unsprung mass 10 so that the delay means 40 is close to the electrical switching means 16 referred to in Fig. 1. A phantom representation of the socket or plug means 40p is included with the illustration of Fig. 6. Preferably the base 40b is provided with a cut-out or recess 40r relative to which a gaseous electric tube 50 such as illustrated in Figs. 7a and 7b can be positioned. The gaseous electric tube 50 is positioned between the base 40b having the recess 40r and a bottom of an intermediate portion 44i of a bracket generally indicated by numeral 44 forming a part of the unitary and compact delay means assembly 40.

The coil 49 referred to in Figs. 2 and 2a is shown in a cross-section elevational view of Fig. 5 and also in the views of Figs. 4, 6, and 7. The coil includes a plurality of turns of wire forming a flat pancake structure relative to a spool 49s made of insulating material and having a central passage 49p relative to which an armature 49a can be shifted in an axial direction. The spool 49s and coil 49 are supported by the bracket 44. A top portion 44t of the bracket provides a backing for a spring means 49m disposed between the top portion 44t of the bracket and a head portion 49h serving as a support for a shading ring or washer 49w of the armature. The spring serves to bias the armature 49a to the right as shown in Fig. 5 and a clip or hook member 49n engages a secondary contact or relay element 48 adapted to establish a shorting circuit around the resistance element 46 and bi-metallic contact 47 described in Figs. 2 and 2a.

A flasher housing 46h is visible in Figs. 4 and 7 wherein the resistance element 46 and bi-metallic contact 47 are disposed. This flasher having the housing 46h is available commercially and is adapted to fit into a narrow space 46s between an intermediate portion 44i of the bracket and a top surface of the base 40b. The hook member 49n on the armature 49a is adapted to shift the shorting contact 48 into a closed position with a fixed contact 48c visible in Fig. 6 and shown schematically in Figs. 2 and 2a whenever the operating voltage of the relay coil 49 is attained due to a heating of resistance element 46 relative to bi-metallic contact 47 or due to ionization of a gas in a gaseous electric tube 50 as indicated earlier.

The fixed contact 48c is preferably made of a strip of metal having a U-shape with lugs 48L adapted to project through suitable slots in the base 40b and adapted to be twisted approximately 45° for establishing a firm mounting for the contact 48c relative to the base 40b as shown in Fig. 3. The bracket 44 has similar lugs 44L also adapted to be twisted after insertion through slots in the base 40b as shown in Fig. 3. Pairs of lugs or terminals are provided for stability though other suitable terminals can be provided. When the solenoid 49 effects movement of the armature 49a, the contact 48 engages fixed contact 48c and closes a circuit relative to a juncture 48j shown in Figs. 2, 2a, 4, 6, and 7.

A pair of terminal lugs 40L can be provided projecting through slots of base 40b and twisted so as to remain in engagement therewith so that proper mounting of the delay means 40 can be obtained relative to a socket or plug means 40p shown in phantom with Fig. 6. The lugs 40L preferably are part of a U-shaped member 40u relative to which the contact 48 is shifted when the spring 49m biases the armature 49a and hook 49n into a position in which the contact 48 is normally open. The bracket 44 has a flange portion 44f including a pair of lugs 44x adapted to project through slots in the base 40b and twisted as shown in Fig. 3. These lugs 44x are adapted to form a ground terminal connection relative to a ground juncture 44j shown in Figs. 2 and 2a. The coil 49 has a lead connected with a U-shaped terminal member 44u provided with a pair of legs or lugs 44z adapted to be electrically connected with junctures represented by numeral 49j in Figs. 2 and 2a. An extra U-shaped terminal member having a pair of lugs or legs 40z projecting through slots in the base 40 can be provided to assure proper mounting of the delay means 40 relative to a socket or plug means 40p. It is to be understood that other terminal means can be provided relative to the base 40b and that the terminal means are illustrated having pairs of legs only because a twist of the legs or lugs is desirable relative to the base 40 so as to provide an inexpensive mounting for the delay means 40 in accordance with the present invention.

The structure of the delay means assembly in accordance with the present invention is adapted to be made with a minimum number of parts including only the base 40b, bracket 44, coil 49 with armature 49a and contact 48 as well as suitable terminal means. The top portion 44t and intermediate portion 44i of the bracket are adapted to retain the flat or pancake coil in assembled relationship relative to the delay means. The intermediate portion 44i of the bracket can be provided with indentations or bosses 49k so that projections or lugs 49i provided with the spool 49s can be locked into engagement relative to the bracket for mounting alignment of the coil 49 relative to the bracket and permitting the armature 49a to be reciprocable in a central passage of the coil 49 and a passage 44p in the bracket 44.

An electrical delay is provided for energization of electric solenoids 20 and 21 for operation of valves 22 and 23 with either embodiment of the present invention because time delay in ionization and heating of gas in tube 50 or "glow bottle" affecting a bi-metallic element or time delay in heating of resistance element 46 affecting bi-metallic contact 47 occurs as the relay or solenoid coil 49 is in series with both element 46 or tube 50 as well as at least one solenoid 20 or 21 of the solenoid valves 22 and 23. Voltage on solenoids 20 or 21 is insufficient to operate valves 22 or 23 so long as the delay means element 46 or tube 50 is operating for a predetermined constant time delay. Only after element 46 or tube 50 has been shorted out will there be sufficient voltage across solenoids 20 or 21 to operate valves 22 or 23 and to permit coil 49 to shift armature 49a for effecting shorting of element 46 or tube 50 to prevent cycling or hunting.

The use of gaseous electric tube 50 is advantageous because the "glow bottle" is relatively unaffected by ambient temperature conditions below 65° C., and would permit constant time delay even if a vehicle equipped with the present invention were used in cold or hot desert regions. Also the gaseous tube 50 operates primarily due to ionization of gaseous medium which cannot be harmed by excessive vibration or shocks that can occur due to road conditions affecting a motor vehicle.

It is to be understood that electrical switching means such as an ignition switch (not shown) can be provided in series with the power source 34 so as to permit disarming or prevention of operation of the electrical delay means and electrically operated valves 22 and 23 when the vehicle is not in use.

As a result of use of electrical delay means there is a limit and control upon operation of valves 22 and 23 for inlet and exhaust of air relative to bellows or air spring 11. This limit and control assures that the valves 22 and 23 will operate only when there is sufficient change in clearance height to warrant use of fluid medium such as compressed air from the reservoir. There is less need for repeated compressor operation because less compressed air is consumed or wasted by the system equipped with electrical delay means in accordance with the present invention. It is to be understood that the time delay means of the present invention is adapted to be used as a compact unit for any circuit where electrical time delay is desired.

It is to be understood also that in the embodiment of Figure 2 a delay relay means is inserted in series with each valve solenoid 20 and 21. In some instances it can be desirable to combine functions of each relay coil 49 with those of solenoids 20 and 21 such that one combined coil can perform the function of actuating an armature such as 49a thereby both operating a shorting contact relative to a gaseous electric tube means or flasher device and also operating either an inlet or an exhaust valve. Each inlet and exhaust valve then features a built-in delay means using a gaseous electric tube means or flasher device in combination with a solenoid operated valve, the coil of which does not attain operating voltage to shift a shorting contact arm as well as a plunger such as a modified and extended version of armature 49a until after time delay governed by the gaseous electric tube means or resistance 46 has been effected.

While the embodiment of the present invention as herein disclosed constitutes a preferred form, it is to be understood that other forms might be adopted.

What is claimed is as follows:

1. A compact and unitary electrical delay means for use in series with an electrically operated valve means adapted to control inlet and exhaust of air relative to an air suspension system air spring provided to maintain a predetermined clearance height between a sprung mass and an unsprung mass of a vehicle also provided with a linkage and electrical switching means sensitive to increase and decrease of height between the sprung and unsprung masses, comprising, a base, a bracket and terminal means mounted relative to said base, a relay coil supported by said bracket, an armature movable centrally of said coil, an impedance-drop means in series with said coil and supported adjacent to said bracket, bi-metal contact means in proximity to said impedance-drop means and adapted to be heated thereby to short out said impedance-drop means thereby permitting full operating voltage to be applied relative to said relay coil, and a relay switch arm adapted to be shifted by said relay coil to effect shunting of said impedance drop means for preventing repeat cycling thereof.

2. The electrical delay means of claim 1 wherein said impedance drop means is a gaseous electric tube having a pair of electrodes at least one of which is a bi-metallic leaf contact adapted to close a circuit to eliminate voltage drop across said gaseous electric tube after a predetermined heating time due to "glow" and ionization of gas within said tube.

References Cited in the file of this patent

UNITED STATES PATENTS

| 2,103,277 | Schmidinger | Dec. 28, 1937 |
| 2,177,832 | Knos | Oct. 31, 1939 |

FOREIGN PATENTS

| 1,122,351 | France | May 22, 1956 |